United States Patent
Chen et al.

(10) Patent No.: US 9,602,196 B2
(45) Date of Patent: Mar. 21, 2017

(54) DEVICES AND METHODS FOR FLOW CONTROL OF MESSAGES IN A PASSIVE OPTICAL NETWORK (PON) AND METHODS THEREIN

(75) Inventors: Ling Chen, Beijing (CN); Laith Said, Viborg (DK)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/409,354

(22) PCT Filed: Jun. 20, 2012

(86) PCT No.: PCT/CN2012/077207
§ 371 (c)(1),
(2), (4) Date: Dec. 18, 2014

(87) PCT Pub. No.: WO2013/189042
PCT Pub. Date: Dec. 27, 2013

(65) Prior Publication Data
US 2015/0188750 A1 Jul. 2, 2015

(51) Int. Cl.
*H04B 10/07* (2013.01)
*H04L 12/24* (2006.01)
(Continued)

(52) U.S. Cl.
CPC .......... *H04B 10/07* (2013.01); *H04B 10/272* (2013.01); *H04L 41/06* (2013.01);
(Continued)

(58) Field of Classification Search
CPC ...... H04B 10/07; H04B 10/27; H04B 10/272; H04B 2210/071;
(Continued)

(56) References Cited

U.S. PATENT DOCUMENTS

2007/0038816 A1* 2/2007 Hughes .................. H04L 12/66
711/147
2007/0109974 A1* 5/2007 Cutillo ................ H04L 12/2856
370/254
(Continued)

FOREIGN PATENT DOCUMENTS

| CN | 1588950 A | 3/2005 |
| CN | 101304281 A | 11/2008 |
| CN | 102480319 A | 5/2012 |

*Primary Examiner* — David Payne
*Assistant Examiner* — Casey Kretzer
(74) *Attorney, Agent, or Firm* — Patents on Demand P.A.; Brian K. Buchheit; Scott M. Garrett

(57) ABSTRACT

A method in an Optical Line Terminal (OLT) device for transmitting a flow control message to an Optical Network Unit/Terminal (ONU/T) device in a Passive Optical Network (PON) access network is provided. The OLT device is configured to receive alarm and/or Attribute Value Change (AVC) messages from the ONU/T device. The OLT device is also configured to temporarily store the alarm and/or AVC messages in a message queue. The OLT device generates a flow control message indicating that the ONU/T device is to stop transmitting alarm and/or AVC messages to the OLT device, when the number of alarm and/or AVC messages in the message queue exceeds a first threshold. Then, the OLT device transmits the flow control message to the ONU/T device(s). An OLT device for transmitting a flow control message to an ONU/T device, and an ONU/T device and related method for receiving a flow control message are also provided.

23 Claims, 4 Drawing Sheets

(51) Int. Cl.
*H04L 12/26* (2006.01)
*H04L 12/825* (2013.01)
*H04B 10/272* (2013.01)
*H04Q 11/00* (2006.01)

(52) U.S. Cl.
CPC .......... *H04L 41/0604* (2013.01); *H04L 43/16* (2013.01); *H04L 47/266* (2013.01); *H04Q 11/0067* (2013.01); *H04B 2210/071* (2013.01); *H04Q 2011/0088* (2013.01)

(58) Field of Classification Search
CPC ............... H04Q 2011/0079–2011/0083; H04L 41/0604; H04L 43/16; H04L 41/069; H04L 47/266
See application file for complete search history.

(56) References Cited

U.S. PATENT DOCUMENTS

| | | | | |
|---|---|---|---|---|
| 2008/0253771 | A1* | 10/2008 | Noel | ............... H04L 41/082 398/67 |
| 2008/0304825 | A1 | 12/2008 | Mahoney | |
| 2010/0052924 | A1* | 3/2010 | Bajpay | ............... H04L 41/0631 340/635 |
| 2010/0316379 | A1* | 12/2010 | Suvakovic | ............ H04J 3/1694 398/58 |
| 2011/0318008 | A1* | 12/2011 | Kubo | ............... H04L 12/12 398/66 |

* cited by examiner

DEVICES AND METHODS FOR FLOW CONTROL OF MESSAGES IN A PASSIVE OPTICAL NETWORK (PON) AND METHODS THEREIN This application is a 371 of International Application PCT/CN2012/077207, filed Jun. 20, 2012, the disclosure of which is fully incorporated herein by reference.

TECHNICAL FIELD

Embodiments herein relate to devices in a Passive Optical Network (PON) and methods therein. In particular, embodiments herein relate to flow control messages in Optical Line Terminal (OLT) and Optical Network Unit/Terminal (ONU/T) devices in a PON.

BACKGROUND

A Passive Optical Network (PON) is an access network that brings optical fibre cabling and signals all or most of the way to the end user in order to provide the end user with e.g. consumer broadband services.

A PON comprises an Optical Line Terminal (OLT) device. The OLT device is located at a central office of a service provider. A service provider may operate the PON to provide the consumer broadband services to the end user. The PON also comprises a number of Optical Network Units/Terminals (ONU/Ts) devices located near the end-users Terminals (TE) or Home Networks (HN). An Optical Distribution Network (ODN) comprising optical fibers and splitters may be used between the OLT device and the ONU/T devices in the PON in order to distribute traffic from the OLT device to the ONU/T devices and vice versa.

A Gigabit-Passive Optical Network (G-PON) is a PON capable of transmitting high bandwidths, i.e. in the order of gigabits per second (Gbps). Other PON networks may e.g. be ATM Passive Optical Network (APON), Broadband Passive Optical Network (BPON), Ethernet Passive Optical Network (EPON), Gigabit-Ethernet Passive Optical Network (GEPON), 10-Gbit/s Ethernet Passive Optical Network (10-G EPON), etc.

However, the configuration and operation of a G-PON is specified in the standards for G-PON.

In the G-PON standards, a list of alarm and Attribute Value Change (AVC) messages is specified. These alarm and AVC messages are generated by ONU/T devices in a G-PON in order to e.g. warn or indicate to an operator that a fault or error has occurred in the access network, or to indicate to an operator that an event has occurred in the ONU/T device causing the ONU/T device to change its operating state, i.e. a state change event, respectively. The alarm and AVC messages are sent by the ONU/T devices to the OLT device.

The OLT device is configured to receive and handle the alarm and AVC messages from the ONU/T devices in a centralized manner.

However, for large scale faults or in large scale deployments, i.e. implementations in which the OLT device may be connected to a large number of ONU/T devices, the OLT device may receive a large number of alarm and AVC messages concurrently. This may cause degradation in the performance of the OLT device.

An Alarm Report Control (ARC) procedure to control alarm messages sent from User Networks Interfaces (UNIs) operating on a Point-To-Point Protocol (PTPP) connected to a G-PON is defined in the standards G984.4 and G988. This ARC procedure may drop the sending of the alarm messages completely or for a specific time period.

However, firstly the ARC procedure only works on UNIs operating on a PTPP, or certain cardholders, that are connected to the G-PON, while many applications in the ONU/T devices also may generate alarm and AVC messages, such as, e.g. Session Initiated Protocol/Plain Old Telephone Service (SIP/POTS) applications, etc.

Secondly, the ARC procedure would also block the normal error report function in the ONU/ONT devices. The normal error report function is important to the access network management system in order to keep monitoring the network. Thus, the ARC procedure is not suitable for use in ONU/T devices.

A rate limit or bandwidth control in the upstream data traffic from the ONU/T devices to the OLT device may also be considered. However, this would only be able to cope with the situation when a single ONU/T device generates a large number of alarm or AVC messages. Normally, for large scale faults or in large scale deployments, the number of alarm and AVC messages generated by a single ONU/T device is limited and will thus most likely fall below the limit of the rate limit or bandwidth control.

SUMMARY

It is an object of embodiments herein to improve the performance of an Optical Line Terminal (OLT) device.

According to a first aspect of embodiments herein, the object is achieved by a method in an Optical Line Terminal, OLT, device for transmitting a flow control message to an Optical Network Unit/Terminal, ONU/T, device in a Passive Optical Network, PON, access network. The OLT device is configured to receive alarm and/or Attribute Value Change, AVC, messages from the ONU/T device. The OLT device is also configured to temporarily store the alarm and/or AVC messages in a message queue. The OLT device generates a flow control message indicating that the ONU/T device is to stop transmitting alarm and/or AVC messages to the OLT device, when the number of alarm and/or AVC messages in the message queue exceeds a first threshold. Then, the OLT device transmits the flow control message to the ONU/T device.

According to a second aspect of embodiments herein, the object is achieved by an Optical Line Terminal, OLT, device for transmitting a flow control message to an Optical Network Unit/Terminal, ONU/T, device in a Passive Optical Network, PON, access network. The OLT device is configured to receive alarm and/or Attribute Value Change, AVC, messages from the ONU/T device. The OLT device then temporarily stores the alarm and/or AVC messages in a message queue. The OLT device comprises a processing circuitry configured to generate flow control message indicating that the ONU/T device is to stop transmitting alarm and/or AVC messages to the OLT device, when the number of alarm and/or AVC messages in the message queue exceeds a first threshold. The processing circuitry is also configured to transmit the flow control message to the ONU/T device.

According to a third aspect of embodiments herein, the object is achieved by a method in an Optical Network Unit/Terminal, ONU/T, device for receiving a flow control message from an Optical Line Terminal, OLT, device in a Passive Optical Network, PON, access network. The ONU/T device is configured to transmit alarm and/or Attribute Value Change, AVC, messages to the OLT device in response to an alarm event and/or a change in an attribute value, respectively. The ONU/T device receives a flow control message from the OLT device indicating that the ONU/T device is to stop transmitting alarm and/or AVC messages to the OLT device. In response to alarm event and/or change in an attribute value, the ONU/T device then stops the transmission of alarm and/or AVC messages to the OLT device, respectively, for a period of time.

According to a fourth aspect of embodiments herein, the object is achieved by a Optical Network Unit/Terminal, ONU/T, device for receiving a flow control message from an Optical Line Terminal, OLT, device in a Passive Optical Network, PON, access network. The ONU/T device being configured to transmit alarm and/or Attribute Value Change, AVC, messages to the OLT device in response to an alarm event and/or a change in an attribute value, respectively. The ONU/T device comprises a processing circuitry configured to receive a flow control message from the OLT device indicating that the ONU/T device is to stop transmitting alarm and/or AVC messages to the OLT device. The processing circuitry is also configured to stop transmitting alarm and/or AVC messages to the OLT device in response to an alarm event and/or a change in an attribute value, respectively, for a period of time.

By generating a flow control message when a message queue threshold is exceeded and transmitting the flow control message to the ONU/T devices as described above, the ONU/T devices are enabled to hold off sending any alarm and/or AVC messages for a particular period of time to the OLT device. This provides the OLT device with a time period for which the OLT device may receive none, or just a few, alarm and/or AVC messages, instead of having to deal with storms of messages and a message queue which may overflow and cause degradation in the performance of the OLT device.

Thus, the OLT device is allowed to handle the received and incoming alarm and/or AVC messages in its message queue in a timely manner. Hence, the performance of the OLT device is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
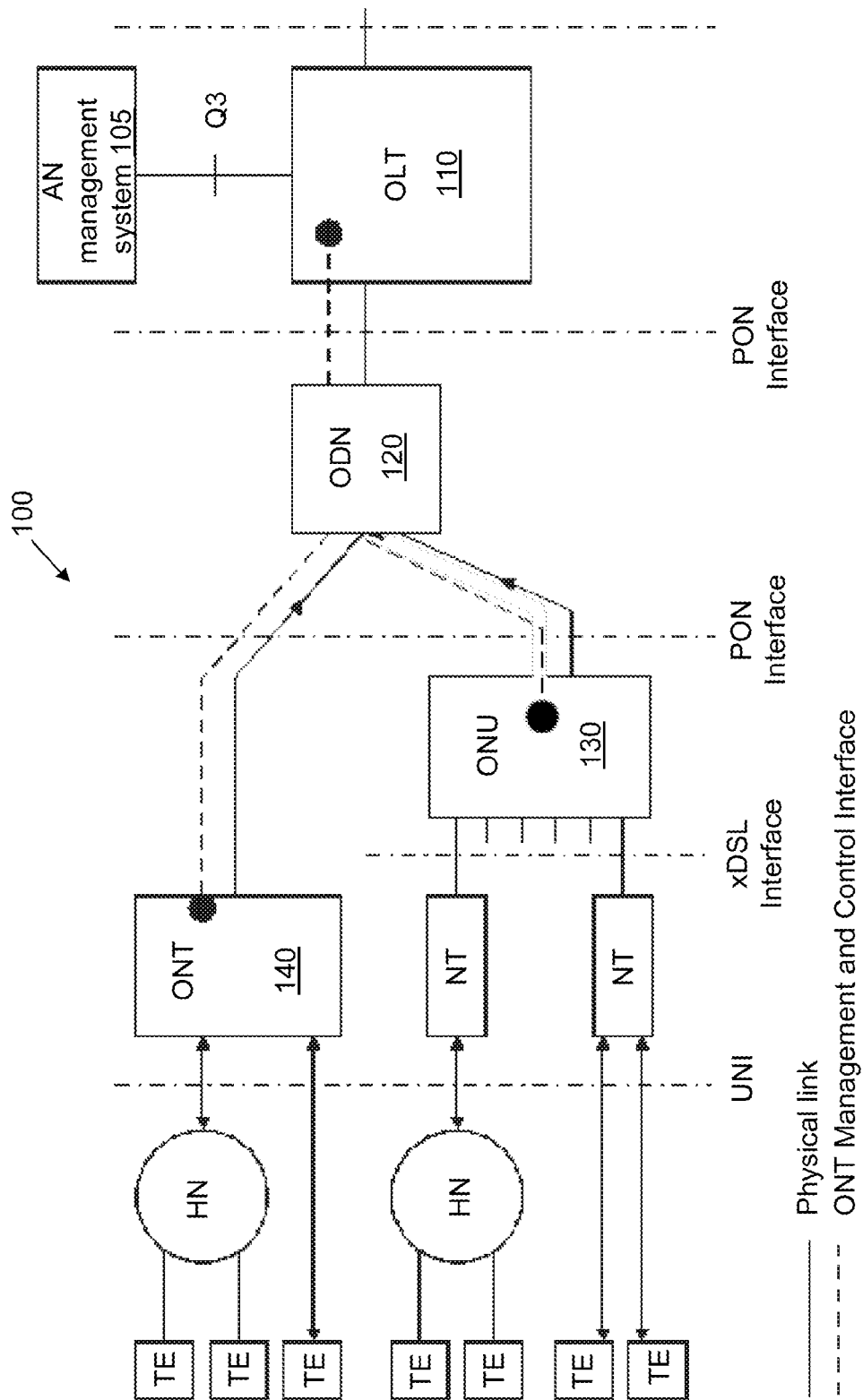
FIG. 1 is a schematic block diagram illustrating embodiments in a network architecture reference model and access network for a Gigabit-Passive Optical Network (G-PON)

The figures are schematic and simplified for clarity, and they merely show details which are essential to the understanding of the embodiments, while other details have been left out. Throughout, the same reference numerals are used for identical or corresponding parts or steps.

FIG. 1 illustrates a G-PON access network 100, i.e. a Passive Optical Network (PON) or a PON access network. The G-PON 100 depicted in FIG. 1 may also be referred to as a network architecture reference model and access network.

The G-PON access network 100 comprises an AN management system 105. The AN management system 105 is used by the service provider of the G-PON access network 100 to monitor the performance of the G-PON access network 100.

The G-PON access network 100 also comprises an OLT device 110. The OLT device is typically located at a service provider's central office. The OLT device 110 may receive data traffic from ONU/T devices 130, 140 located near the end-users TEs or HNs. The OLT device 110 may also transmit data traffic to ONU/T devices 130, 140.

The G-PON access network 100 may further comprise an ODN 120 and one or more ONU/T devices 130, 140. It should be noted that the term ONU/T device is herein used to refer to either one or both of the ONU device 130 and the ONT device 140.

The ODN 120 may be connected to the one or more ONU/T devices 130, 140 and the OLT device 110. The ODN 120 comprises optical fibers and splitters, and is configured to provide optical communication between the one or more ONU/T devices 130, 140 and the OLT device 110. Thus, the ODN 120 is configured to distribute data traffic from the OLT device 110 to one or more ONU/T devices 130, 140, e.g. the ODN 120 may split data streams from the OLT device 110 to the respective one or more ONU/T devices 130, 140. The ODN is also configured to propagate data traffic from the one or more ONU/T devices 130, 140 to the OLT device 110.

The ONU 130 may be connected to one or more Network Terminals (NTs). The ONU 130 is configured to communicate with the NTs via e.g. xDSL Interfaces. Each NT may in turn be connected to one or more Home Networks (HNs) and/or directly connected to one or more Terminal Equipments (TEs). The NTs are configured to communicate with the one or more HNs and/or the one or more TEs via e.g. User Networks Interfaces (UNIs). The ONU 130 may also be defined as a device that terminates any one of the distributed end-points of an ODN 120, implements a PON protocol and adapts PON Protocol Data Units (PDUs) to subscriber service interfaces, e.g. the UNIs of the HN or TEs.

The ONT 140 may be connected to one or more HNs and/or directly connected to one or more TEs. The ONT 140 is configured to communicate with the one or more HNs and/or the one or more TEs via e.g. UNIs. The ONT 140 may also be defined as a single subscriber device that terminates any one of the distributed end-points of an ODN 120, implements a PON protocol and adapts PON PDUs to subscriber service interfaces, i.e. the UNIs of the HNs or TEs. The ONT 140 may be seen as a special case of an ONU 130.

In FIG. 1, the fully drawn lines indicate the physical links between the access network management system 105, the OLT device 110, the ODN 120, the ONU/T devices 130, 140, HNs, NTs, and TEs in the access network. Also, in FIG. 1, the dashed lines indicate the communication paths of the ONT Management and Control Interface over which control messages in the G-PON may be transmitted.

Most commonly, the ONU/T devices 130, 140 are configured to report as much Alarms and AVCs as possible, i.e. via alarm and AVC messages to the OLT device 110. Then, the OLT device 110 leaves it to the access network management system 105 to filter and process the alarm and AVC messages from the ONU/T devices 130, 140. This is performed so that the operator, e.g. service provider, of the access network is able to continuously keep monitoring the G-PON access network 100. In other words, the operator normally expects the OLT device 110 to have enough performance to handle any large number of alarm and AVC messages, i.e. message storms. In order to achieve this high demand on the performance of the OLT device 110, the cost of the hardware in the OLT device 110 increases.

Figure 2:
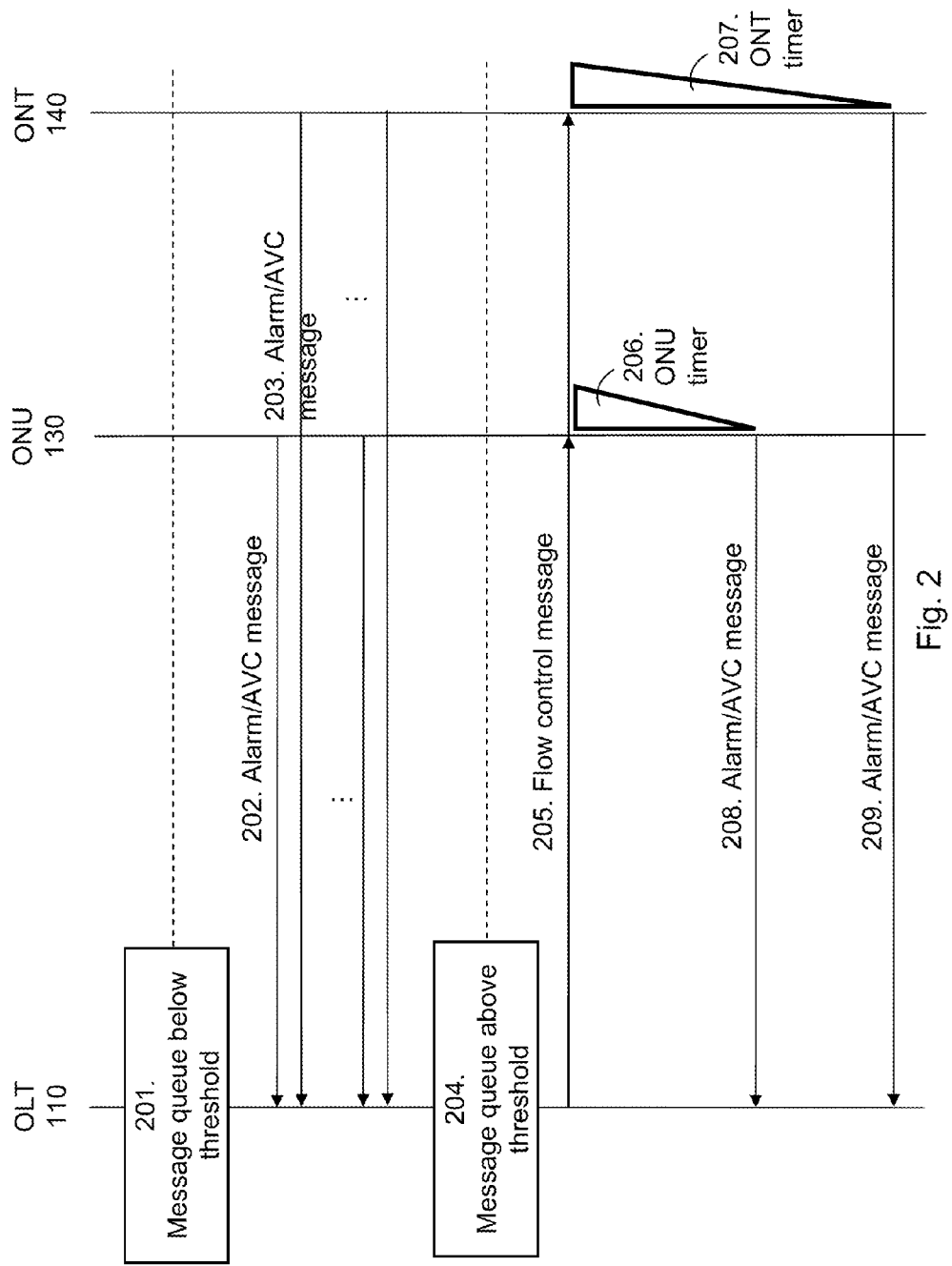
FIG. 2 is a flowchart depicting embodiments of a method in an OLT device.

FIG. 2 shows a schematic combined flowchart and signalling scheme depicting an exemplary overview of some embodiments of methods in an OLT device 110 and an ONU/T device 130, 140 as described in below with reference to FIGS. 3-6.

Action 201

The OLT device 110 may receive alarm and/or AVC messages from one or more ONU/T devices 130, 140 and handle these accordingly, i.e. as described in the G.984.4 and G.988 standards. Here, the first message threshold in the OLT device 110 is not exceeded, i.e. the OLT device 110 may handle the number of message in its message queue without any significantly degrading effect on the performance of the OLT device 110. This is the normal operational mode of the OLT device 110.

Action 202-203

In these actions, the ONU/T devices 130, 140 may start to transmit a large number of alarm and/or AVC messages to the OLT device 110. This may, for example, occur when there has been a large fault somewhere in the access network 100 or if the access network 100 comprises a large amount of ONU/T devices 130, 140.

Action 204

A large amount of alarm and/or AVC messages received at the OLT device 110 may cause the number of message in the message queue in the OLT device 110 to exceed the first threshold. This causes the OLT device 110 to generate a flow control message in accordance with the embodiments described below in Action 301.

Action 205

In this action, the OLT device 110 may transmit the flow control message to either one or both of the ONU/T devices 130, 140 in accordance with the embodiments described below in Action 302.

Action 206

The ONU device 130 receives the flow control message in accordance with the embodiments described below in Action 501. Upon reception of the flow control message in the ONU device 130, the ONU device 130 may generate a random period of time. Alternatively, the ONU device 130 may already comprise a time period value. The ONU device 130 may then start an ONU timer according to the random period of time or according to the time period value already comprised in the ONU device 130. In some embodiments, the ONU device 130 may start the ONU timer according to a first, second, third or fourth random period of time in accordance with the embodiments described below in Action 502.

Until the ONU timer expires, the ONU device 130 stops, i.e. holds off, transmitting any alarm and/or AVC messages to the OLT device Action 207

The ONT device 140 receives the flow control message in accordance with the embodiments described below in Action 501. Upon reception of the flow control message in the ONT device 140, the ONT device 140 may generate a random period of time. Alternatively, the ONT device 140 may already comprise a time period value. In this action, the ONT device 140 may then start an ONT timer according to the random period of time or according to the time period value already comprised in the ONT device 140. In some embodiments, the ONT device 140 may start the ONT timer according to the first, second, third or fourth random period of time in accordance with the embodiments described below in Action 502.

Until the ONT timer expires, the ONT device 140 stops, i.e. holds off, transmitting any alarm and/or AVC messages to the OLT device.

Action 208

When the ONU timer in the ONU device 130 expires, the ONU device 130 may resume the transmission of alarm and/or AVC messages to the OLT device 110 in response to alarm events and/or changes in an attribute value, respectively. This may be performed in accordance with the embodiments described below in Action 503.

Action 209

When the ONT timer in the ONT device 140 expires, the ONT device 140 may resume the transmission of alarm and/or AVC messages to the OLT device 110 in response to alarm events and/or changes in an attribute value, respectively. This may be performed in accordance with the embodiments described below in Action 503.

Embodiments of a method in an OLT device 110 will now be described with reference to the flowchart depicted in FIG. 3. The flowchart in FIG. 3 describes a method in the OLT device 110 for transmitting a flow control message to the ONU/T device 130,140 in the G-PON access network 100. As mentioned above, the OLT device 110 is configured to receive alarm and/or Attribute Value Change, AVC, messages from the ONU/T device 130, 140. The OLT device 110 is configured to temporarily store the alarm and/or AVC messages in a message queue.

Figure 3:
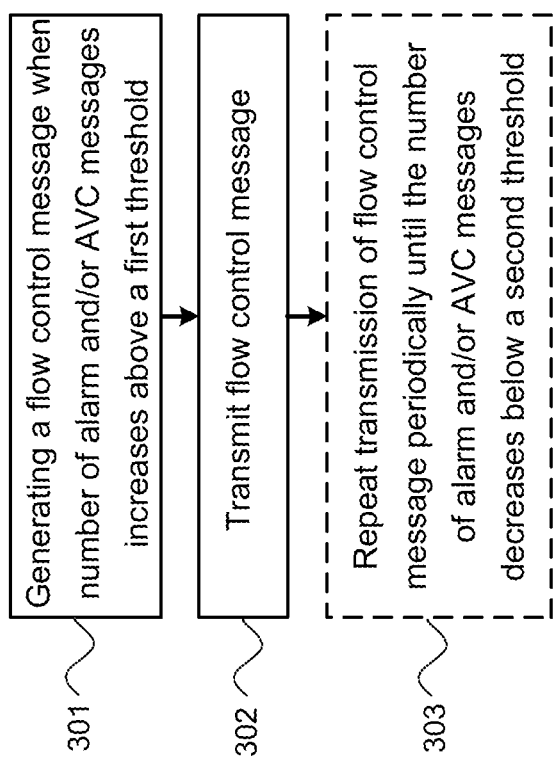
FIG. 3 is a flowchart depicting embodiments of a method in an ONU/T device.

FIG. 3 is an illustrating example of detailed exemplary actions or operations which may be taken by the OLT device 110. It should be appreciated that the flowchart diagram is provided merely as an example and that the OLT device 110 may be configured to perform any of the exemplary actions or operations provided herein. It should also be appreciated that the actions or operations illustrated below are merely examples, thus it is not necessary for all the actions or operations to be performed. It should further be appreciated that the actions or operations may be performed in any combination and in any suitable order. Furthermore, the flowchart in FIG. 3 comprises the following actions which may be Action 301

When the number of alarm and/or AVC messages in the message queue exceeds a first threshold, the OLT device 110 generates a flow control message indicating that the ONU/T device 130, 140 is to stop transmitting alarm and/or AVC messages to the OLT device 110.

The ONU/T device 130, 140 should here be interpreted as at least one ONU/T device 130, 140 or one or more ONU/T devices 130, 140. The flow control message may, for example, be a Physical Layer Operations, Administration and Maintenance, PLOAM, message. It should here be noted that the wording "exceeds a first threshold" may be interpreted as increasing above or decreasing below the first threshold depending on the specifics of the particular implementation. The first threshold may also be referred to as a first message queue threshold, an upper message queue threshold, or similar.

In some embodiments, the OLT device 110 detects from which ONU/T device(s) 130, 140 the alarm and/or AVC messages in the message queue originated. Here, as an option, the OLT device 110 may indicate the ONU/T device(s) 130, 140 from which the alarm and/or AVC messages originated in the flow control message. In this way, the OLT device 110 may target the specific ONU/T device(s) 130, 140 that should stop or hold off the transmissions of alarm and/or AVC messages to the OLT device 110. This may be performed by using an identity of each ONU/T device 130, 140. The identity of an ONU/T device 130, 140 may, for example, be an ONU bitmap or ONU-ID bitmap, e.g. ONU Bitmap field indicated in Table 1 or 2.

In some embodiments, the OLT device 110 indicates, in the flow control message, a lower limit of a period of time, an upper limit of a period of time, or both a lower and an upper limit of a period of time, for which period of time the ONU/T device 130, 140 is to stop transmitting alarm and/or AVC messages to the OLT device 110. These limits of the period of time in which the ONU/T device 130, 140 is to stop transmitting alarm and/or AVC messages may also be referred to as Flow Control Timer(s), and may be indicated as such in the flow control message, e.g. as shown in Table 1 or 2. In this way, the OLT device 110 may adjust for how long the ONU/T device(s) 130, 140 should stop or hold off the transmissions of alarm and/or AVC messages to the OLT device 110. These periods of time may be configured in the OLT device 110 or be determined by the OLT device 110 dynamically based on any number of parameters in the OLT device 110, such as, e.g. the amount of messages in the message queue.

Action 302

To inform the ONU/T device 130, 140 to stop transmitting alarm and/or AVC messages to the OLT device 110, the OLT device 110 transmits the flow control message to the ONU/T device 130,140.

In some embodiments, the OLT device 110 transmits the flow control message only to the ONU/T device(s) 130, 140 from which the alarm and/or AVC messages was sent, i.e. originated. This may be performed by only addressing the ONU/T device(s) 130, 140 from which the alarm and/or AVC messages originated in the flow control message. This may also be referred to herein as direct or unicast messages.

Alternatively, in some embodiments, the OLT device 110 transmits the flow control message by broadcasting the flow control message to all or some of the ONU/T device(s) 130, 140 connected to the OLT device 110, e.g. by sending the flow control message out to all ONU/T device(s) 130, 140 on all PON interface or on the same PON interface, respectively. This may, for example, be performed when the OLT device 110 has indicated in the flow control message, the ONU/T device(s) 130, 140 from which the alarm and/or AVC messages originated. This may be referred to herein as broadcast or multicast messages.

For example, the message structure of the flow control message may e.g. be defined as in Table 1 below (similar to the generic PLOAM message structure defined in the G. 987.3 standard):

TABLE 1

| Octet | Content | Description |
| --- | --- | --- |
| 1-2 | ONU/T-ID | Address indicating that the message is a directed message to one ONU/T or a broadcast message to all ONU/T devices. |
| 3 | Message type ID | Message type ID indicating that this is a flow control message. |
| 4 | Sequence Number | PLOAM sequence number |

TABLE 1-continued

| Octet | Content | Description |
| --- | --- | --- |
| 5-40 | ONU/T Bitmap | Data comprising a bitmap, in which bitmap every bit represents an ONU/T ID on the PON interface. This data is optional and may be used when per ONU/T device control is desired. |
|  | Flow Control Timer(s) | Data comprising a time value(s)/limit(s) suggested to the ONU/T device how long it shall suppress its Alarm/AVC messages. |
| 41-48 | MIC | Message Integrity Check |

The octet column in Table 1 defines how many octets of data may be used in the flow control message and which octets of data may be used by which content in the flow control message, i.e. the order of the content in the flow control message. The content column in Table 1 defines the different types of content that may be comprised in the flow control message. The description column explains the different types of content in the flow control message and what it may be used for.

In another example, the message structure of the flow control message may e.g. be defined as in Table 2 below (similar to the generic PLOAM message structure defined in the G. 984.3 standard):

TABLE 2

| Octet | Content | Description |
| --- | --- | --- |
| 1 | Broadcast message | Address indicating that the message is a broadcast message to all ONUs. |
| 2 | Message type ID | Message type ID indicating that this is a flow control message. |
| 3-12 | ONU/T-ID Bitmap | Data comprising a bitmap, in which bitmap every bit represents an ONU/T ID on the PON interface. This data is optional and may be used when per ONU/T device control is desired. |
|  | Flow Control Timer(s) | Data comprising a time value(s)/limit(s) suggested to the ONU/T device how long it shall suppress its Alarm/AVC messages. |

The octet column in Table 2 defines how many octets of data may be used in the flow control message and which octets of data may be used by which content in the flow control message, i.e. the order of the content in the flow control message. The content column in Table 2 defines the different types of content that may be comprised in the flow control message. The description column explains the different types of content in the flow control message and what it may be used for.

Action 303

In this optional action and according to some embodiments, the OLT device 110 may repeat the transmission of the flow control message to the ONU/T device(s) 130, 140 until the number of alarm and/or AVC messages from the ONU/T device(s) 130, 140 in the message queue exceeds a second threshold. It should here be noted that the wording "exceeds a second threshold" may be interpreted as increasing above or decreasing below the second threshold depending on the specifics of the particular implementation. The first threshold may also be referred to as a second message queue threshold, an lower message queue threshold, or similar. In some embodiments, this may also be performed periodically.

This may ensure that the number of messages in the messages queue at the OLT device 110 eventually will fall below a number of messages which is deemed to be suitable in order for any degradation in the performance of the OLT device 110 to be reduced or eliminated.

Figure 4:
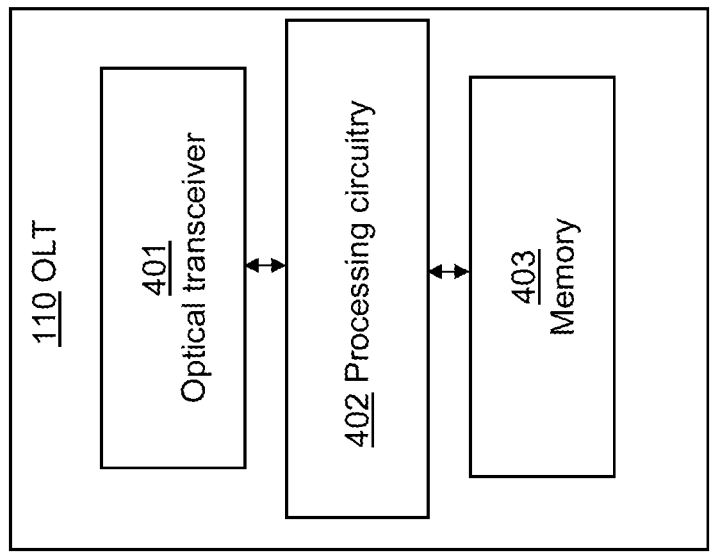
FIG. 4 is a schematic combined flowchart and signalling scheme depicting embodiments of methods in OLT and ONU/T devices.

To perform the method actions for transmitting a flow control message, the OLT device 110 comprises the following arrangement depicted in FIG. 4. FIG. 4 shows a schematic block diagram of embodiments of the OLT device 110.

As mentioned above, the OLT device 110 is configured to transmit a flow control message to an ONU/T device 130, 140 in a G-PON access network 100. The OLT device 110 is further configured to receive alarm and/or AVC messages from the ONU/T device 130, 140. The OLT device 110 is also further configured to temporarily store the alarm and/or AVC messages in a message queue.

The OLT device 110 comprises a processing circuitry 502 configured to generate a flow control message indicating that the ONU/T device 130, 140 is to stop transmitting alarm and/or AVC messages to the OLT device 110. This is performed when the number of alarm and/or AVC messages in the message queue exceeds a first threshold. The OLT device 110 is configured to transmit the generated flow control message to the ONU/T device 130, 140. This may, for example, be performed via an optical transceiver circuitry 501.

The processing circuitry 502 may further be configured to detect from which ONU/T devices 130, 140 the alarm and/or AVC messages in the message queue originated. In some embodiments, the OLT device 110 may then transmit the flow control message only to the ONU/T devices 130, 140 from which the alarm and/or AVC messages originated. Alternatively, the processing circuitry 502 may be configured to indicate in the flow control message, the ONU/T devices 130, 140 from which the alarm and/or AVC messages originated.

In some embodiments, the processing circuitry 502 may be configured to indicate in the flow control message a period of time. The period of time may be a lower limit of a period of time, an upper limit of a period of time, or both a lower and an upper limit of a period of time. The time period is for which the ONU/T device 130, 140 is to stop transmitting alarm and/or AVC messages to the OLT device 110.

In some embodiments, the processing circuitry 502 may be configured to repetitively transmit the flow control message until the number of alarm and/or AVC messages from the ONU/T devices 130, 140 in the message queue exceeds a second threshold. The processing circuitry 502 may be configured to perform the repetitive transmissions periodically. It should be noted that the wording "exceeds a second threshold" here may be interpreted as increasing above or decreasing below the second threshold depending on the implementation.

In some embodiments, the processing circuitry 502 may be configured to broadcast the flow control message to all of the ONU/T devices 130, 140 connected to the OLT device 110. Advantageously, this may be performed when the processing circuitry 502 also is configured to indicate in the flow control message, the ONU/T devices 130, 140 from which the alarm and/or AVC messages originated.

Figure 5:
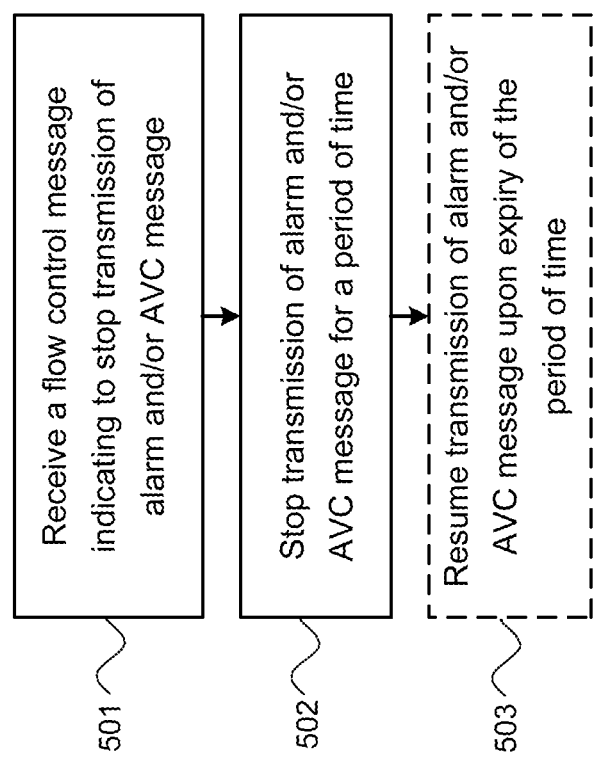
FIG. 5 is a block diagram depicting embodiments of an OLT device.

The embodiments herein for transmitting a flow control message in the OLT device 110 may be implemented through one or more processors, such as a processing circuitry 502 in the OLT device 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the OLT device 110. One such carrier may be in the form of a CD ROM disc. It is however feasible with other data carriers such as a memory stick. The computer program code may furthermore be provided as pure program code on a server and downloaded to the OLT device 110.

The OLT device 110 may further comprise a memory 503 comprising one or more memory units. The memory 360 may be arranged to be used to store data, received data streams and messages, such as, e.g. alarm and AVC messages from the ONU/T devices 130, 140, to perform the methods herein when being executed in the OLT device 110.

Those skilled in the art will also appreciate that the processing circuitry 502 and the memory 503 described above may refer to a combination of analog and digital circuits, and/or one or more processors configured with software and/or firmware, e.g. stored in a memory, that when executed by the one or more processors such as the processing circuitry 502 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Embodiments of a method in an ONU/T device 130, 140 will now be described with reference to the flowchart depicted in FIG. 5. The flowchart in FIG. 5 describes a method in an ONU/T device 130, 140 for receiving a flow control message from an OLT device 110 in a G-PON access network 100. The ONU/T device 130, 140 is configured to transmit alarm and/or AVC messages to the OLT device 110 in response to an alarm event and/or a change in an attribute value, respectively.

FIG. 5 is an illustrating example of detailed exemplary actions or operations which may be taken by an ONU/T device 130, 140. It should be appreciated that the flowchart diagram is provided merely as an example and that the ONU/T device 130, 140 may be configured to perform any of the exemplary actions or operations provided herein. It should also be appreciated that the actions or operations illustrated below are merely examples, thus it is not necessary for all the actions or operations to be performed. It should further be appreciated that the actions or operations may be performed in any combination. Furthermore, the flowchart in FIG. 5 comprises the following actions, and may also be implemented for any of the above and below mentioned embodiments or in any combination with those.

Action 501

In this action, the ONU/T device 130, 140 receives a flow control message from the OLT device 110. The flow control message indicates that the ONU/T device 130,140 is to stop transmitting alarm and/or AVC messages to the OLT device 110. In case the flow control message is a directed message, i.e. directly addressed, to the ONU/T device 130,140, the ONU/T device 130, 140 may receive and handle the flow control message accordingly. In case the flow control message is a broadcasted message, i.e. addressed to some or all ONU/devices 130 140 in the access network 100, the ONU/T device 130, 140 may check if a ONU/T-ID comprised in the flow control message correspond to the ONU/T-ID of the ONU/T device 130, 140. If this is true, the ONU/T device 130, 140 may receive and handle the flow control message accordingly. If this is false, the ONU/T device 130, 140 may drop the flow control message.

Action 502

In this action, the ONU/T device 130, 140 stops, i.e. holds off, the transmission of alarm and/or AVC messages to the OLT device 110 in response to alarm event and/or change in an attribute value, respectively, for a period of time. It should be noted that the stop in transmission of the alarm and/or AVC messages also may be referred to as suppressing or delaying the transmission of the alarm and/or AVC messages.

In some embodiments, the ONU/T device 130, 140 comprises a time period value to be used as the period of time, i.e. the time period may be pre-determined and configured in the ONU/T device 130, 140.

In some embodiments, the ONU/T device 130, 140 generates a first random period of time to be used as the period of time. This may be performed such that the period of time of the ONU/T devices 130, 140 in the G-PON access network 100 does not all expire at the same time, but are randomly spread across a particular time span. This helps in alleviating congestion of alarm and/or AVC messages at the OLT device 110.

According to one exemplary embodiment, when the flow control message comprises a lower limit of the period of time, the ONU/T device 130, 140 may generate a second random period of time to be used as the period of time. This second random period of time may e.g. be between the lower limit of the period of time and an upper limit of the period of time configured in the ONU/T device 130, 140.

According to another exemplary embodiment, when the flow control message comprises an upper limit of the period of time, the ONU/T device 130, 140 may generate a third random period of time to be used as the period of time. This third random period of time may e.g. be between 0 and the upper limit of the period of time comprised in the flow control message.

According to a further exemplary embodiment, when the flow control message comprises both a lower limit and an upper limit of the period of time, the ONU/T device 130, 140 may generate a fourth random period of time to be used as the period of time. This fourth random period of time may e.g. be between the lower and upper limits of the period of time comprised in the flow control message.

These generated random time periods may also referred to a pseudo-random timer periods. Advantageously, these random time periods provide an improved distribution in time of alarm and/or AVC messages in the G-PON access network 100 which alleviates congestion at the OLT device 110.

Action 503

In this optional action, the ONU/T device 130, 140 may resume, upon expiry of the period of time, the transmission of alarm and/or AVC messages to the OLT device 110 in response to alarm events and/or change in an attribute values, respectively.

This will put the ONU/T device 130, 140 back into a normal operational mode or state in which the ONU/T device 130, 140 again starts to transmit the alarm and/or AVC messages in the conventional manner.

Figure 6:
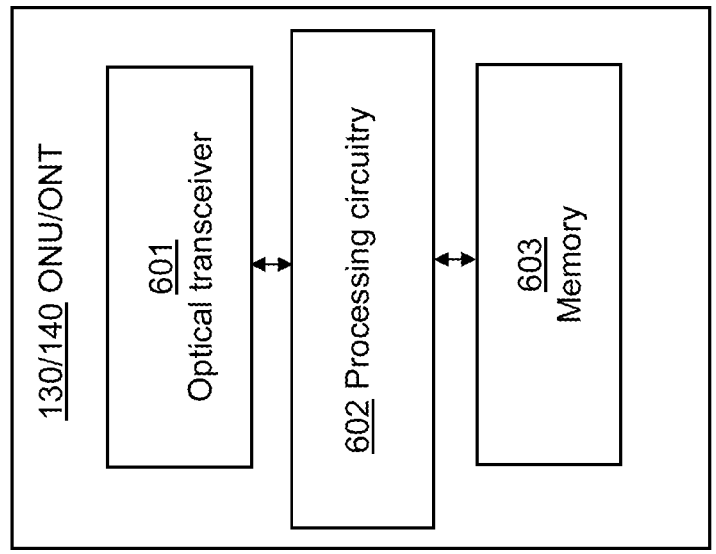
FIG. 6 is a block diagram depicting embodiments of an ONU/T device.

To perform the method actions for receiving a flow control message, the ONU/T device 130, 140 comprises the following arrangement depicted in FIG. 6. FIG. 6 shows a schematic block diagram of embodiments of the ONU/T device 130, 140.

The ONU/T device 130, 140 is configured to receive a flow control message from an OLT device 110 in a G-PON access network 100. The ONU/T device 130, 140 is also configured to transmit alarm and/or AVC messages to the OLT device 110 in response to an alarm event and/or a change in an attribute value, respectively.

The ONU/T device 130, 140 comprises a processing circuitry 602 configured to receive a flow control message from the OLT device 110 indicating that the ONU/T device 130, 140 is to stop transmitting alarm and/or AVC messages to the OLT device 100. This may, for example, be performed via an optical transceiver circuitry 501. The processing circuitry 602 is further configured to stop transmitting alarm and/or AVC messages to the OLT device 110 in response to an alarm event and/or a change in an attribute value, respectively, for a period of time.

In some embodiments, the processing circuitry 602 may be configured to, upon expiry of the period of time, resume to transmit alarm and/or AVC messages to the OLT device 110 in response to alarm events and/or changes in an attribute value, respectively.

In some embodiments, the processing circuitry 602 may be configured to generate a first random period of time to be used as the period of time for which the processing circuitry 602 is configured to stop transmitting alarm and/or AVC messages to the OLT device 110 in response to alarm events and/or a changes in an attribute value, respectively. Alternatively, the processing circuitry 602 may be configured with time period to be used as the period of time.

In some embodiments, when the flow control message from the OLT device 110 comprises a lower limit of the period of time, the processing circuitry 602 may be configured to generate a first random period of time to be used as the period of time. The first random period of time may be between the lower limit of the period of time and an upper limit of the period of time configured in the ONU/T device 130, 140.

In some embodiments, when the flow control message comprises an upper limit of the period of time, the processing circuitry 602 may be configured to generate a third random period of time to be used as the period of time. The third random period of time may be between 0 and the upper limit of the period of time comprised in the flow control message.

In some embodiments, when the flow control message comprises both a lower limit and an upper limit of the period of time, the processing circuitry 602 may be configured to generate a fourth random period of time to be used as the period of time. The fourth random period of time is between the lower and upper limits of the period of time comprised in the flow control message.

The embodiments herein for receiving a flow control message in the ONU/T device 130, 140 may be implemented through one or more processors, such as a processing circuitry 602 in the ONU/T device 130, 140 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the ONU/T device 130, 140. One such carrier may be in the form of a CD ROM disc. It is however feasible with other data carriers such as a memory stick. The computer program code may furthermore be provided as pure program code on a server and downloaded to the ONU/T device 130, 140.

The ONU/T device 130, 140 may further comprise a memory 603 comprising one or more memory units. The memory 360 may be arranged to be used to store data, received data streams and messages, e.g. flow control messages from the OLT device 110, to perform the methods herein when being executed in the ONU/T device 130, 140.

Those skilled in the art will also appreciate that the processing circuitry 602 and the memory 603 described above may refer to a combination of analog and digital circuits, and/or one or more processors configured with software and/or firmware, e.g. stored in a memory, that when executed by the one or more processors such as the processing circuitry 602 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that the embodiments described herein improves the traffic on the GPON link by flattening possible bursts of alarm and AVC messages which may occur in the access network 110. This relaxes the requirement for buffer and processing time in the OLT device 110. The OLT device 110 may thus utilize the available performance to process other control plane packets that may be more important, or the OLT device 110 may be equipped with a cheaper processor or processing circuitry 502.

The embodiments herein are not limited to the above described preferred embodiments. Various alternatives, modifications and equivalents may be used. Therefore, the above embodiments should not be construed as limiting.

ABBREVIATIONS

AN Access Node
ARC Alarm Report Control
ASIC Application-Specific Integrated Circuit
AVC Attribute Value Change
G-PON Gigabit-Passive Optical Network
HN Home Network
NT Network Terminal
ODN Optical Distribution Node
ONU/T Optical Network Unit/Terminal
OLT Optical Line Terminal
PLOAM Physical Layer Operations, Administration and Maintenance
PDU Protocol Data Units
POTS Plain Old Telephone Service
PTPP Point-To-Point Protocol
SIP Session Initiated Protocol
SoC System-On-a-Chip
UNI User Networks Interfaces
DSL Digital Subscriber Line

The invention claimed is:

1. A method in an Optical Line Terminal (OLT) device for transmitting a flow control message to one or more Optical Network Unit/Terminal (ONU/T) devices in a Passive Optical Network (PON) access network, wherein the OLT device is configured to receive alarm and/or Attribute Value Change (AVC) messages from the one or more ONU/T devices and to temporarily store the alarm and/or AVC messages in a message queue, the method comprising:
    detecting from which ONU/T device(s) the alarm and/or AVC messages in the message queue originated;
    generating the flow control message indicating to stop transmitting the alarm and/or AVC messages to the OLT device, when a number of alarm and/or AVC messages in the message queue exceeds a first threshold, wherein the flow control message indicates at least one of a lower limit of a period of time, an upper limit of the period of time, and both the lower and the upper limit of the period of time for which the ONU/T device(s), from which the alarm and/or AVC messages originated, is to stop transmitting the alarm and/or AVC messages to the OLT device; and
    transmitting the flow control message only to the ONU/T device(s) from which the alarm and/or AVC messages originated.

2. The method according to claim 1, wherein the generating further comprises and indicating in the flow control message, the ONU/T device(s) from which the alarm and/or AVC messages originated.

3. The method according to claim 2, wherein the ONU/T device(s) are indicated using an identity of each ONU/T device, wherein the identity of an ONU/T device is an ONU-ID bitmap.

4. The method according to claim 1, further comprising repeating the transmission of the flow control message until the number of alarm and/or AVC messages from the ONU/T device(s) in the message queue exceeds a second threshold.

5. The method according to claim 1, wherein the transmitting further comprises broadcasting the flow control message to all ONU/T devices connected to the OLT device.

6. The method according to claim 1, wherein the flow control message is a Physical Layer Operations, Administration and Maintenance (PLOAM) message.

7. An Optical Line Terminal (OLT) device for transmitting a flow control message to one or more Optical Network Unit/Terminal (ONU/T) devices in a Passive Optical Network (PON) access network, wherein the OLT device is configured to receive alarm and/or Attribute Value Change (AVC) messages from the one or more ONU/T devices and to temporarily store the alarm and/or AVC messages in a message queue, the OLT device comprising:
    a processing circuitry configured to:
    detect from which ONU/T device(s) the alarm and/or AVC messages in the message queue originated;
    generate the flow control message indicating that the one or more ONU/T devices are to stop transmitting alarm and/or AVC messages to the OLT device, when a number of alarm and/or AVC messages in the message queue exceeds a first threshold, and
    transmit the flow control message only to the ONU/T device(s) from which the alarm and/or AVC messages originated.

8. The OLT device according to claim 7, wherein the processing circuitry is further configured to indicate in the flow control message, the detected ONU/T device(s) from which the alarm and/or AVC messages originated.

9. The OLT device according to claim 7, wherein the processing circuitry is further configured to indicate in the flow control message, a lower limit of the period of time, an upper limit of the period of time, or both a lower and an upper limit of the period of time, and wherein the period of time is a time for which the ONU/T device(s) from which the alarm and/or AVC messages originated, is to stop transmitting the alarm and/or AVC messages to the OLT device.

10. The OLT device according to claim 7, wherein the processing circuitry is further configured to transmit the flow control message until the number of alarm and/or AVC messages from the ONU/T device(s) in the message queue exceeds a second threshold.

11. The OLT device according to claim 7, wherein the processing circuitry is further configured to broadcast the flow control message to all or some of the one or more ONU/T devices connected to the OLT device.

12. A method in an Optical Network Unit/Terminal (ONU/T) device for receiving a flow control message from an Optical Line Terminal (OLT) device in a Passive Optical Network (PON) access network, wherein the ONU/T device is configured to transmit alarm and/or Attribute Value Change (AVC) messages to the OLT device in response to an alarm event and/or a change in an attribute value, respectively, the method comprising:
receiving, by a processing circuitry, the flow control message from the OLT device indicating that the ONU/T device is to stop transmitting the alarm and/or AVC messages to the OLT device, wherein the flow control message indicates at least one of a lower limit of a period of time, an upper limit of the period of time, and both the lower and the upper limit of the period of time for which the ONU/T device is to stop transmitting the alarm and/or AVC messages to the OLT device; and
stopping, by the processing circuitry, the transmission of the alarm and/or AVC messages to the OLT device in response to an alarm event and/or change in an attribute value, respectively, for the period of time.

13. The method according to claim 12, further comprising resuming, by the processing circuitry, upon expiry of the period of time, the transmission of the alarm and/or AVC messages to the OLT device in response to alarm events and/or changes in an attribute value, respectively.

14. The method according to claim 12, wherein the stopping the transmission further comprises generating a first random period of time to be used as the period of time.

15. The method according to claim 14, wherein, when the flow control message comprises the lower limit of the period of time, the stopping the transmission further comprises generating a second random period of time to be used as the period of time, and wherein the second random period of time is between the lower limit of the period of time and the upper limit of the period of time configured in the ONU/T device.

16. The method according to claim 15, wherein, when the flow control message comprises the upper limit of the period of time, the stopping the transmission further comprises generating a third random period of time to be used as the period of time, and wherein the third random period of time is between 0 and the upper limit of the period of time comprised in the flow control message.

17. The method according to claim 16, wherein, when the flow control message comprises both the lower limit of the period of time and the upper limit of the period of time, the stopping the transmission further comprises generating a fourth random period of time to be used as the period of time, and wherein the fourth random period of time is between the lower limit of the period of time and the upper limit of the period of time comprised in the flow control message.

18. An Optical Network Unit/Terminal (ONU/T) device for receiving a flow control message from an Optical Line Terminal (OLT) device in a Passive Optical Network (PON) access network, the ONU/T device being configured to transmit alarm and/or Attribute Value Change (AVC) messages to the OLT device in response to an alarm event and/or a change in an attribute value, respectively, the ONU/T device comprising:
a processing circuitry configured to:
receive the flow control message from the OLT device indicating that the ONU/T device is to stop transmitting the alarm and/or AVC messages to the OLT device, wherein the flow control message indicates at least one of a lower limit of a period of time, an upper limit of the period of time, and both the lower and the upper limit of the period of time for which the ONU/T device is to stop transmitting the alarm and/or AVC messages to the OLT device, and
stop transmitting the alarm and/or AVC messages to the OLT device in response to an alarm event and/or a change in an attribute value, respectively, for the period of time.

19. The ONU/T device according to claim 18, wherein the processing circuitry is further configured to, upon expiry of the period of time, resume to transmit the alarm and/or AVC messages to the OLT device in response to an alarm event and/or change in an attribute value, respectively.

20. The ONU/T device according to claim 18, wherein the processing circuitry is further configured to generate a first random period of time to be used as the period of time.

21. The ONU/T device according to claim 20, wherein the processing circuitry is further configured to generate a second random period of time to be used as the period of time when the flow control message comprises the lower limit of the period of time, and wherein the second random period of time is between the lower limit of the period of time and the upper limit of the period of time configured in the ONU/T device.

22. The ONU/T device according to claim 21, wherein the processing circuitry is further configured to generate a third random period of time to be used as the period of time when the flow control message comprises the upper limit of the period of time, and wherein the third random period of time is between 0 and the upper limit of the period of time comprised in the flow control message.

23. The ONU/T device according to claim 22, wherein the processing circuitry is further configured to generate a fourth random period of time to be used as the period of time when the flow control message comprises both the lower limit of the period of time and the upper limit of the period of time, and wherein the fourth random period of time is between the lower limit of the period of time and the upper limit of the period of time comprised in the flow control message.

* * * * *